United States Patent [19]

Goetz

[11] Patent Number: 4,817,828

[45] Date of Patent: Apr. 4, 1989

[54] INFLATABLE RESTRAINT SYSTEM

[75] Inventor: George W. Goetz, Detroit, Mich.

[73] Assignee: TRW Automotive Products Inc., Lyndhurst, Ohio

[21] Appl. No.: 915,266

[22] Filed: Oct. 3, 1986

[51] Int. Cl.$^4$ .............................................. B67B 7/24
[52] U.S. Cl. .................................... 222/3; 280/736; 102/288
[58] Field of Search ............... 222/3, 5; 280/736, 737, 280/740, 741; 102/530, 286, 283, 288; 137/854

[56] References Cited

U.S. PATENT DOCUMENTS

| | | | |
|---|---|---|---|
| 404,053 | 5/1889 | Quick | 102/288 |
| 677,528 | 7/1901 | Maxim | 102/288 |
| 3,708,181 | 1/1973 | Mazelsky | 222/3 |
| 3,711,115 | 1/1973 | Lohr | 280/736 |
| 3,807,755 | 4/1974 | Mason, Jr. | 280/736 |
| 3,898,048 | 8/1975 | Barber et al. | 102/39 |
| 3,912,458 | 10/1975 | Fukuma et al. | 280/740 |
| 3,985,076 | 10/1976 | Schneiter et al. | 102/39 |
| 4,005,876 | 2/1977 | Jorgensen et al. | 280/741 |
| 4,012,211 | 3/1977 | Goetz | 55/485 |
| 4,017,100 | 4/1977 | Gehrig et al. | 280/736 |
| 4,094,248 | 6/1978 | Jacobson | 102/288 |
| 4,109,578 | 8/1978 | Goetz | 102/39 |
| 4,131,300 | 12/1978 | Radke et al. | 280/737 |
| 4,137,847 | 2/1979 | Osborne | 102/39 |
| 4,158,696 | 6/1979 | Wilhelm | 280/736 |
| 4,191,392 | 3/1980 | Barnett | 280/740 |
| 4,200,615 | 4/1980 | Hamilton et al. | 422/166 |
| 4,296,084 | 10/1981 | Adams et al. | 422/166 |
| 4,322,385 | 3/1982 | Goetz | 422/165 |
| 4,370,930 | 2/1983 | Strasser et al. | 102/530 |
| 4,380,346 | 4/1983 | Davis et al. | 280/736 |
| 4,386,569 | 6/1983 | Deas | 413/6 |
| 4,394,033 | 7/1983 | Goetz et al. | 280/736 |
| 4,397,596 | 8/1983 | Strasser et al. | 102/292 |
| 4,408,534 | 10/1983 | Araki et al. | 102/288 |
| 4,414,902 | 11/1983 | Strasser et al. | 102/531 |
| 4,547,342 | 10/1985 | Adams et al. | 422/166 |
| 4,578,247 | 3/1986 | Bolleau | 422/165 |

Primary Examiner—Charles A. Marmor
Assistant Examiner—Kenneth Noland
Attorney, Agent, or Firm—Tarolli, Sundheim & Covell

[57] ABSTRACT

An inflatable restraint system includes an airbag which is expanded by an inflator assembly to restrain movement of an occupant of a vehicle in the event of a collision. The inflator assembly includes a plurality of grains or bodies of gas generating material which are disposed in a longitudinally extending array and are enclosed by a filter assembly and a housing. To promote a rapid and uniform combustion of the grains to quickly generate a large volume of gas, passages extend through the grains between spaces at opposite ends of the grains. Uniform combustion of the grains is promoted by having the passages located on concentric circles with the longitudinal axes of the passages spaced apart by equal distances along the circles. The axes of the passages on one concentric circle are circumferentially spaced from the axes of the passages on another concentric circle. The grains positioned with the passages in axial alignment and are cushioned by resilient retainer tubes which engage the outside of the grains. When the airbag has become inflated, a pressure control valve system is opened to exhaust excess gas generated by the combustion of the grains.

14 Claims, 10 Drawing Sheets

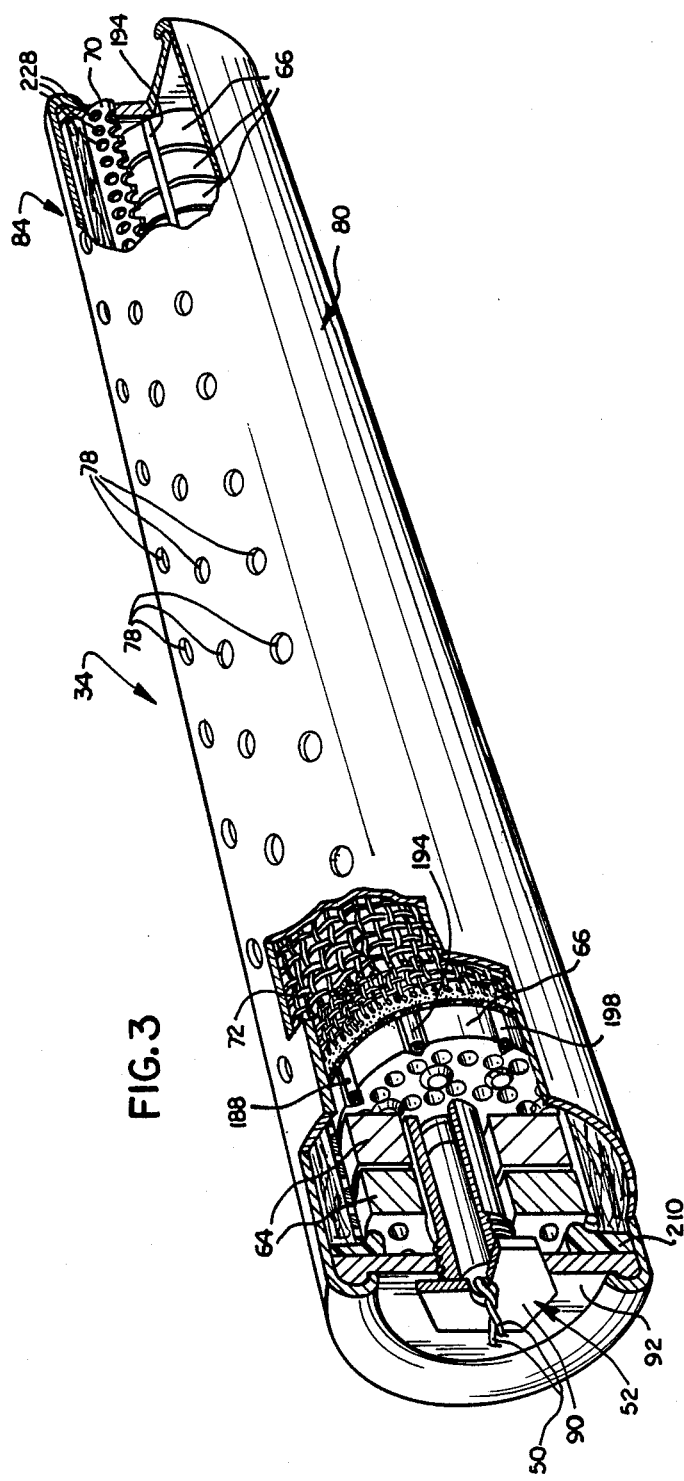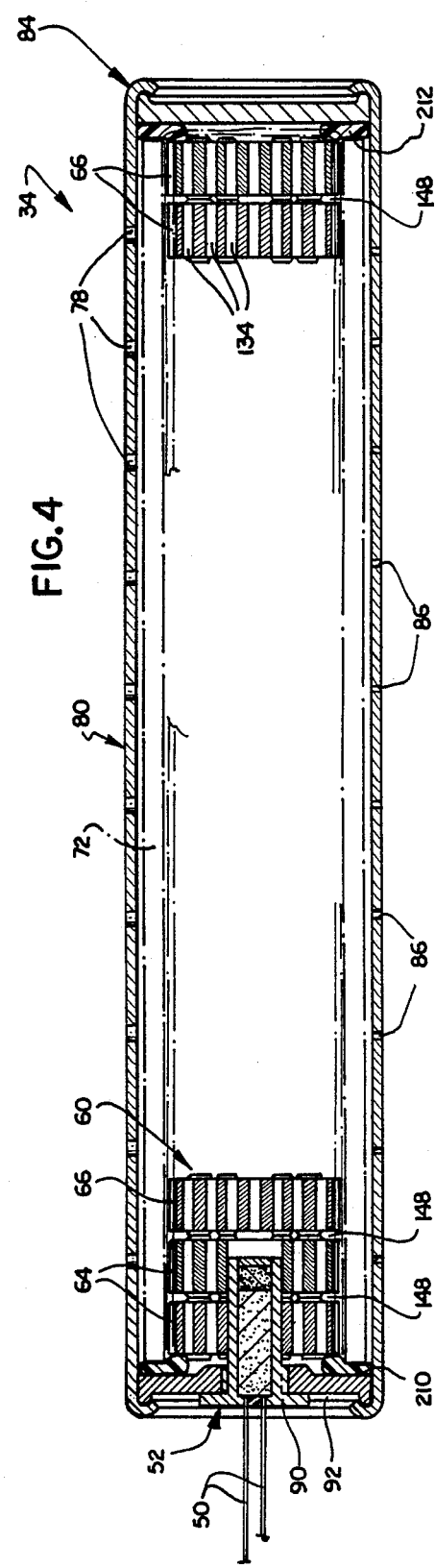

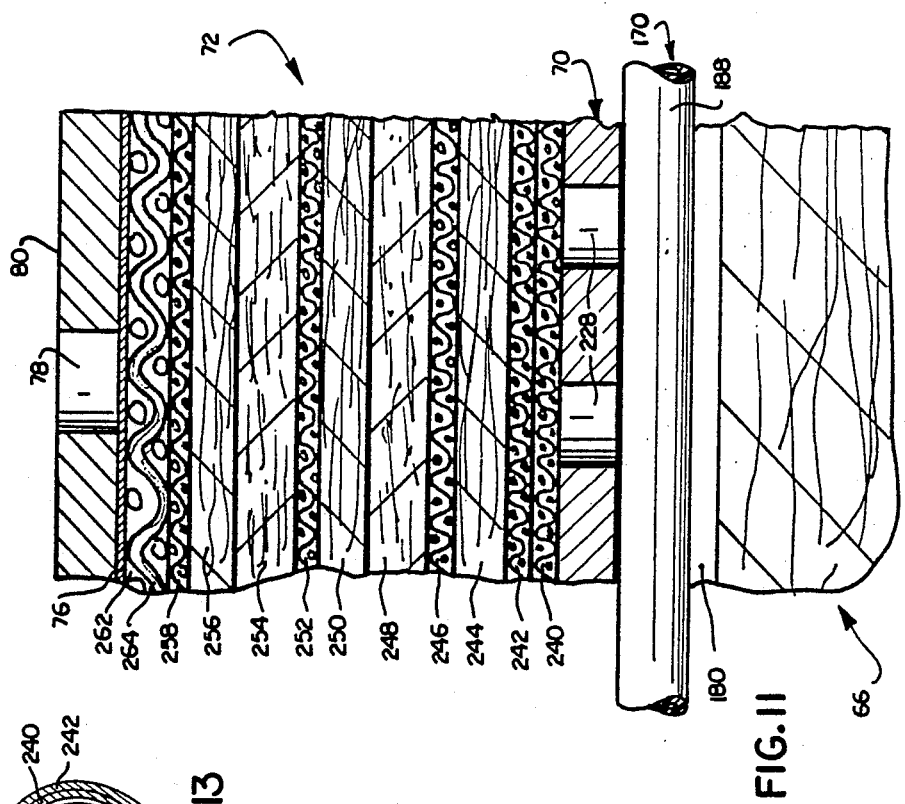
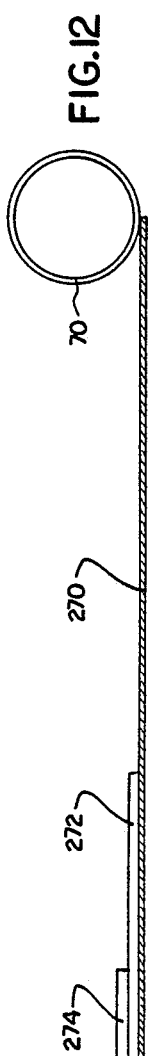
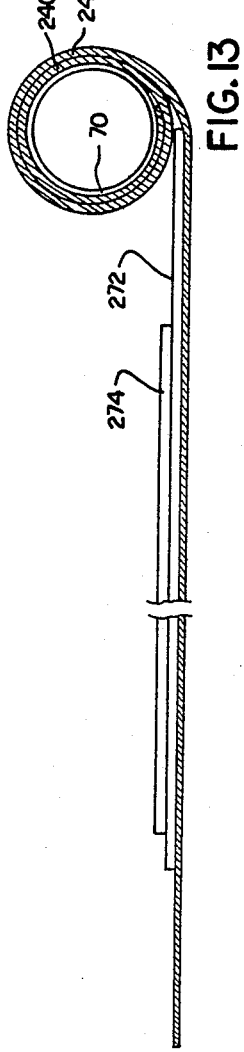
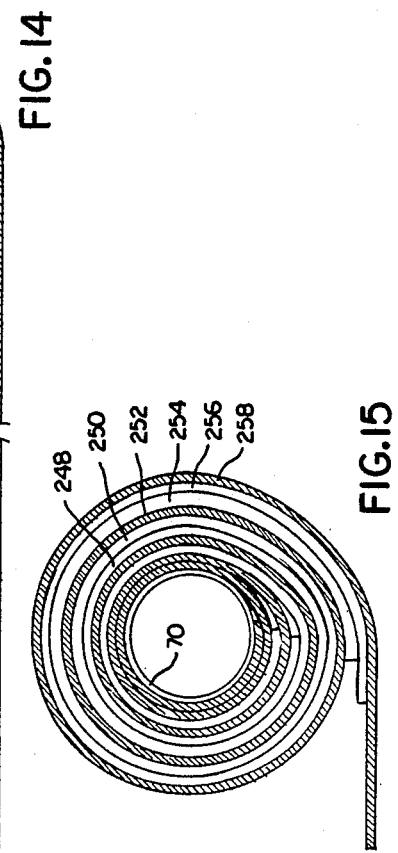
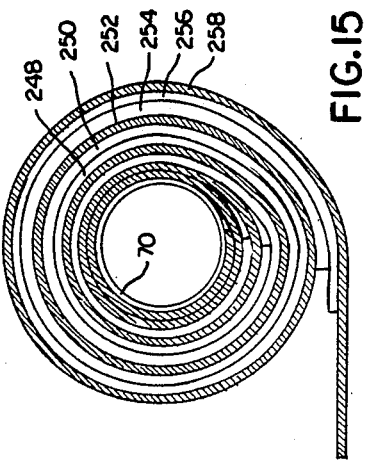

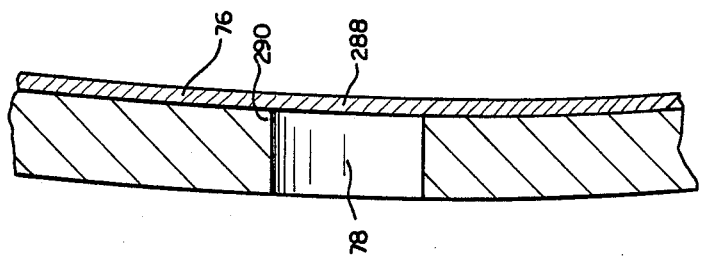
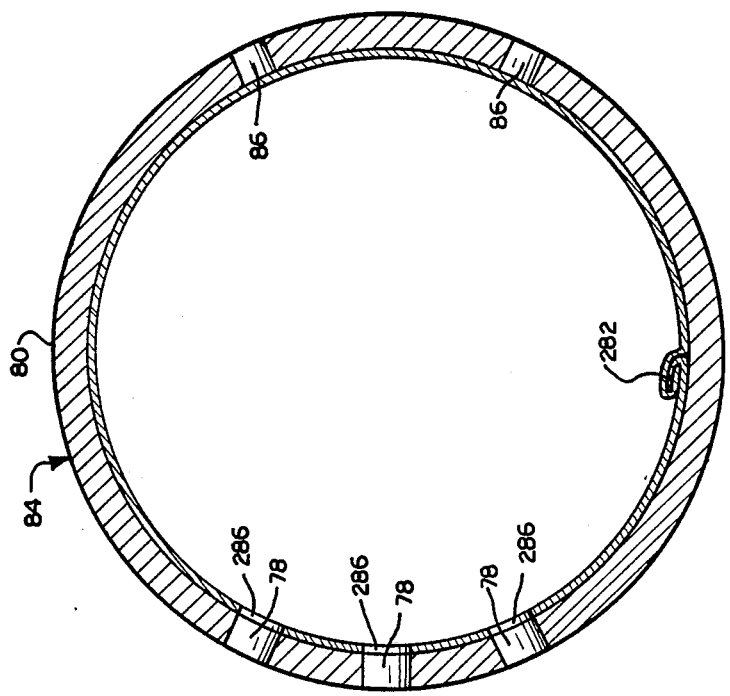
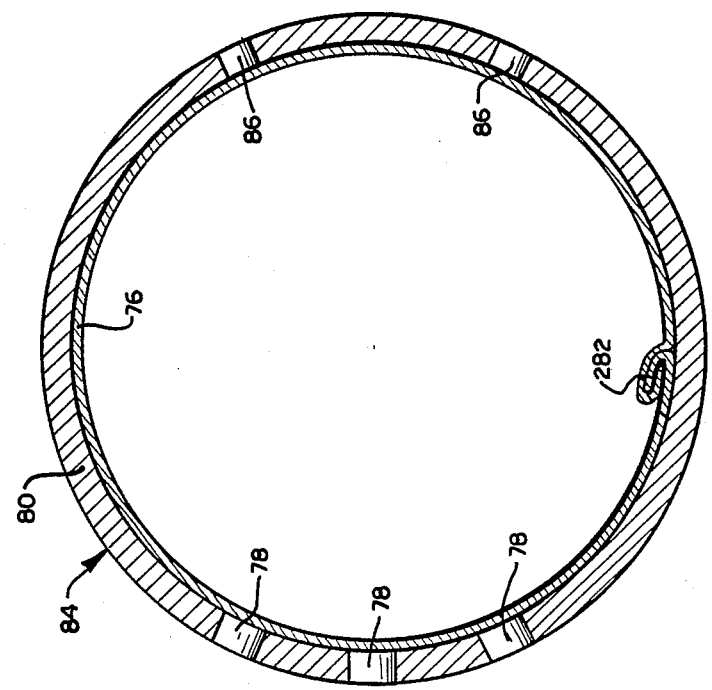

INFLATABLE RESTRAINT SYSTEM

BACKGROUND OF THE INVENTION

The present invention relates to an apparatus for generating gas for inflating a vehicle occupant restraint which restrains movement of an occupant of a vehicle in the event of a collision. More specifically, the invention relates to an inflator assembly which generates gas to expand an airbag which cushions movement of a vehicle occupant in the event of a collision.

A known safety apparatus for restraining movement of an occupant of a vehicle in the event of a collision includes an airbag which is expanded by the flow of gas obtained from gas generating material in an inflator assembly. In order to protect the occupant of a vehicle adequately during a collision, the inflator assembly quickly generates a large quantity of gas and directs the gas into the airbag. The vehicle may be involved in a collision at a very high ambient temperature or at a very low ambient temperature. Thus, the inflator assembly must be able to provide the required quantity of gas to expand the airbag properly over a large range of ambient temperatures.

In very cold weather, the inflator assembly builds pressure more slowly than in warm weather so there is a tendency in cold weather for the airbag to be inflated too slowly or insufficiently to perform its intended purpose. Also, as the ambient temperature increases, the burn rate of the gas generating material increases. Consequently, at higher ambient temperatures, high pressures are created and the deployment velocity of the airbag increases. It is desirable that the airbag function uniformly at all ambient temperatures.

Also, the inflator assembly must be able to endure normal vibrations and shock loads to which a vehicle is subjected while being driven over many different types of roads. It is particularly important that the gas generating material in the inflator assembly be able to withstand severe vibrations and shock loads due to the vehicle encountering uneven roads and deep chuck holes.

Although the operating and durability requirements of the inflator assembly are very stringent, the safety apparatus must have a reasonable cost in order to obtain consumer acceptance. Thus, the components of the safety apparatus must be easily assembled and installed in a vehicle. However, once the inflator assembly has been installed in the vehicle, it must be capable of withstanding forces to which it is subjected due to driving of the vehicle for many miles for a relatively long period of time. If and when the vehicle is involved in a collision, the inflator assembly must be capable of quickly generating a volume of gas sufficient to inflate the airbag.

SUMMARY OF THE PRESENT INVENTION

The present invention provides an improved inflator assembly which generates gas to expand an airbag to restrain movement of an occupant of a vehicle when the vehicle is involved in a collision. In order to provide a relatively large volume of gas quickly to expand an airbag, the inflator assembly includes grains of a material which generates gas upon combustion.

The grains are cylindrical in shape and have passages extending axially therethrough. The centers of the passages are located on concentric circles, the centers of which are located on the central axes of the grains. The axes of the passages are spaced equal distances apart about the concentric circles and the axes of the passages on one of the concentric circles are circumferentially spaced from the axes of the passages on the adjacent concentric circle. This arrangement of the passages provides for uniform burning of the grains.

The grains are located in the inflator assembly with their axial end surfaces facing each other. As the surfaces defining the passages burn, the gas generated by the burning flows through the passages to the axial ends of the grain. To enable gas to flow from the passages radially between the grains and into the airbag, the ends of the grains are axially spaced apart. Specifically, the axial end surfaces of each grain have projections which engage the adjacent grain and provide space through which the gas can flow radially between the grains.

The grains of the gas generating material are located internally of a structure which includes a filter assembly. The generated gas flows through the filter assembly and into the airbag. The grains are supported by resilient retainer tubes which engage the outside of the grains and keep the passages in the grains axially aligned. In addition to maintaining the grains in axial alignment, the retainer tubes are made of a resiliently yieldable material to cushion the grains against forces encountered during normal operation of the vehicle. Further, the retainer tubes minimize contact between the grains and the surrounding structure, which contact could damage the grains.

The inflator assembly has first passages for directing gas into the airbag and second passages for directing gas away from the airbag. The first and second passages are blocked prior to activation of the inflator assembly. The first passages open to direct gas into the airbag when a sufficient pressure builds up in the inflator assembly. Thus, the airbag is not subjected to relatively low pressures which would cause the airbag to be slowly or otherwise improperly inflated under cold weather conditions. If the pressure in the inflator assembly is too high, as may occur when the ambient temperature is high, the second passages open to direct gas away from the airbag. Thus, the airbag is not subjected to excessive gas pressures because of high ambient temperatures.

The first and second passages in the inflator open at different pressures. This occurs because a rupturable foil covers the first and second passages in the inflator and the first passages are larger in cross section than the second passages. Thus, the foil covering the first passages ruptures at a lower pressure than the foil covering the second passages.

DESCRIPTION OF THE DRAWINGS

The foregoing and other objects and features of the present invention will become more apparent upon a consideration of the following description taken in connection with the accompanying drawings wherein:

FIG. 3 is a fragmentary pictorial view of an inflator assembly used in the inflatable restraint system of FIGS. 1 and 2;

FIG. 4 is a sectional view of the inflator assembly of FIG. 3, illustrating the relationship between a housing for the inflator assembly and a plurality of grains of gas generating material disposed in a longitudinally extending array in the housing;

FIG. 11 is an enlarged fragmentary sectional view of a filter used in the inflator assembly of FIGS. 3 and 4;

FIG. 12 is a schematic illustration depicting the manner in which a rigid perforated tube is positioned relative to a piece of screen during the making of the filter of FIG. 11;

FIG. 13 is a schematic illustration depicting how two layers of screen are wound around the tube during the formation of the filter;

FIG. 14 is a schematic illustration depicting the manner in which a layer of steel wool and an additional layer of screen is wound around the tube during the formation of the filter;

FIG. 15 is a schematic illustration depicting the manner in which layers of fiberglass and additional layers of steel wool and screen are wound around the tube during the formation of the filter;

FIG. 16 is a fragmentary sectional view illustrating the relationship of a housing of the inflator assembly to a sheet of foil which functions as a pressure control for the gas conducted from the inflator assembly;

FIG. 17 is a sectional view, generally similar to FIG. 16, illustrating how openings are formed in the foil to direct the flow of gas into the airbag during expansion of the airbag;

FIG. 18 is an enlarged illustration depicting the relationship between the layer of foil and a housing opening through which gas is directed from the inflator assembly into the airbag;

DESCRIPTION OF AN EMBODIMENT OF THE INVENTION

General Description of Inflatable Restraint System

Figure 1:
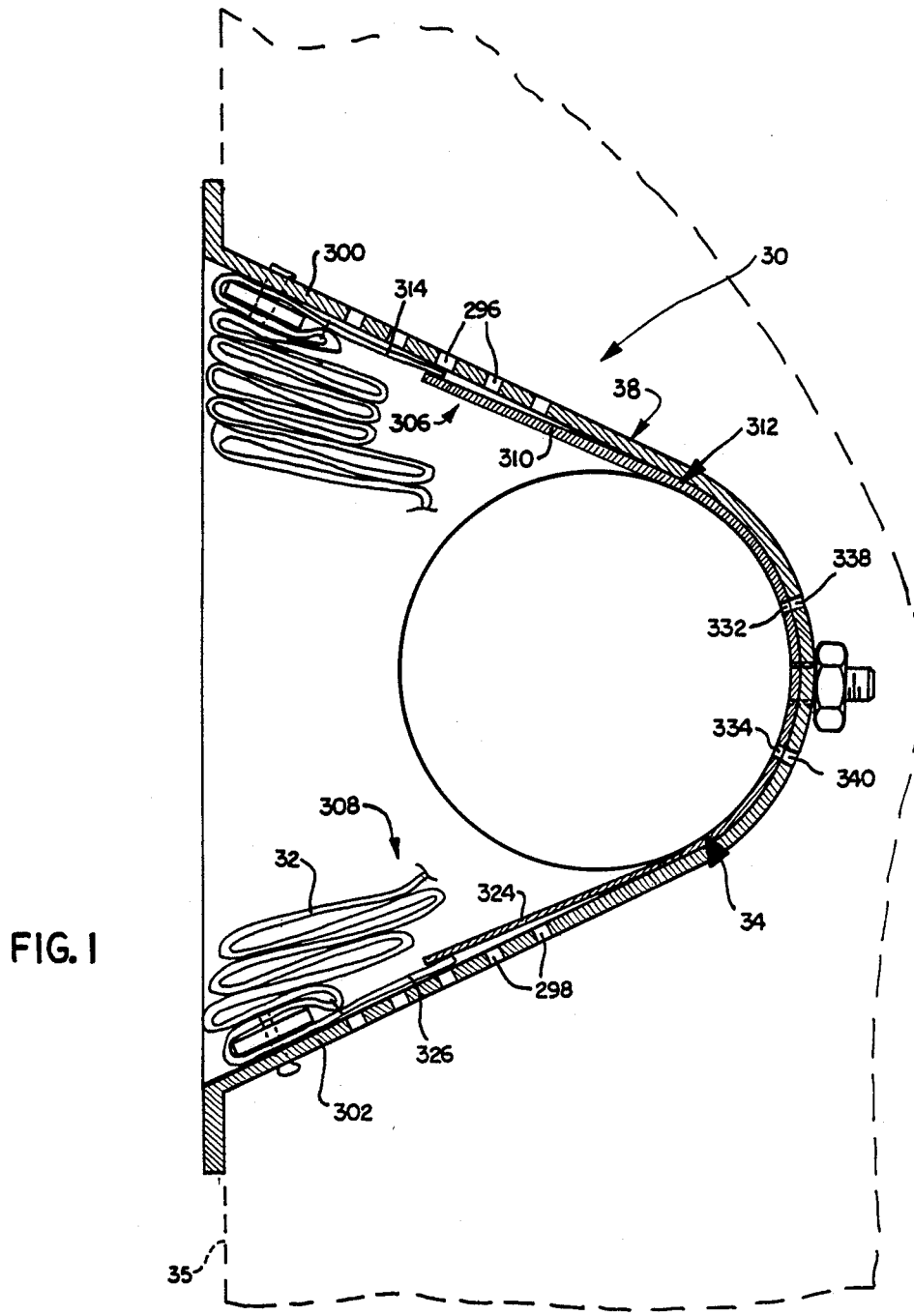
FIG. 1 is a fragmentary sectional view of an inflatable restraint system constructed in accordance with the present invention, the restraint system being shown in an inactive condition prior to a vehicle being involved in a collision.

An inflatable restraint system 30 constructed in accordance with the present invention is illustrated in FIG. 1 in an inactive condition prior to the vehicle being involved in a collision. When the vehicle becomes involved in a collision, an airbag 32 is expanded from a collapsed condition, shown in FIG. 1, to an extended condition, shown in FIG. 2, by a rapid flow of gas from an inflator assembly 34. When the airbag 32 is in the extended condition, it is effective to restrain movement of an occupant of a vehicle and it prevents the occupant from violently contacting structural parts of the vehicle interior.

Figure 2:
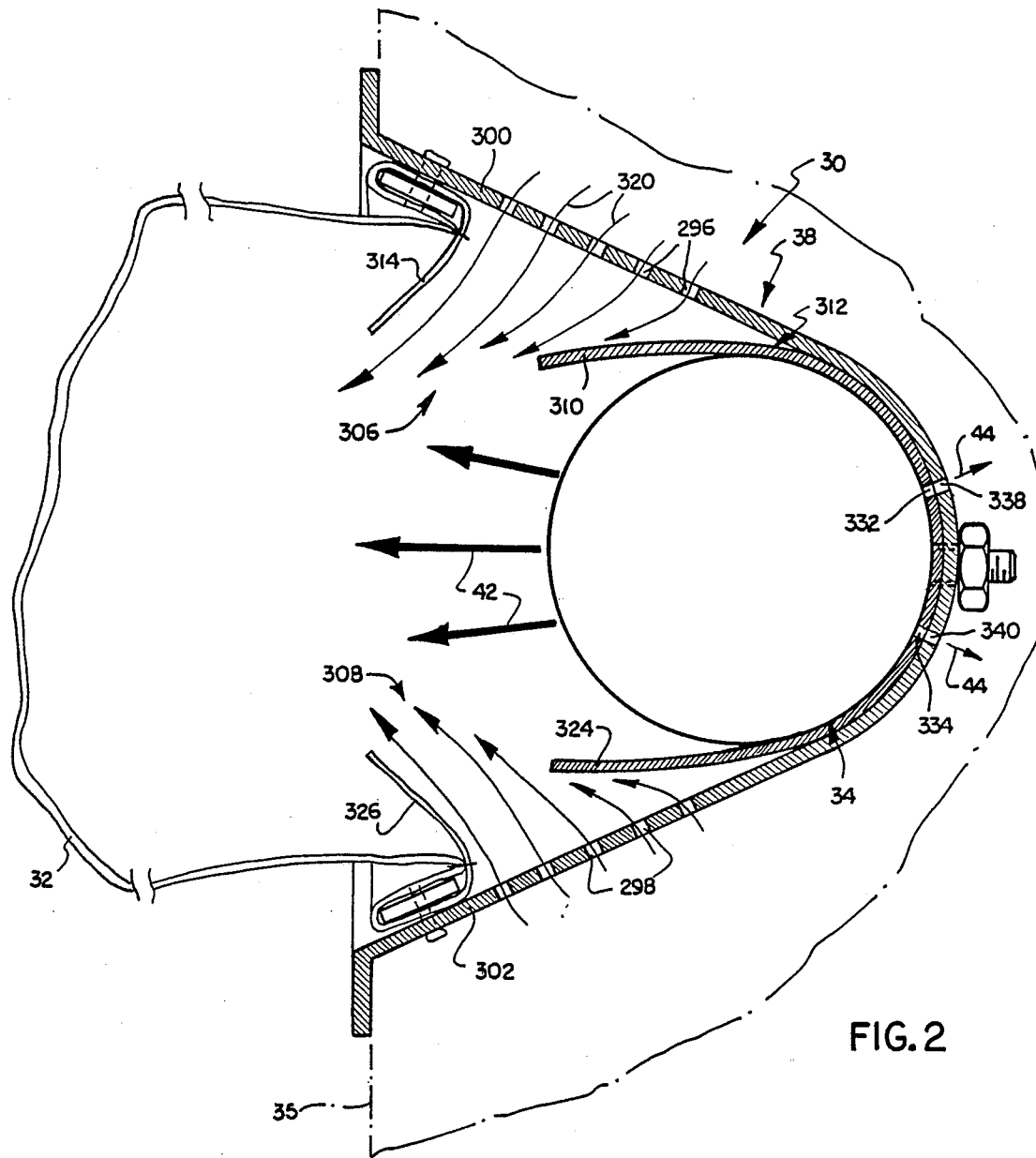
FIG. 2 is a fragmentary schematic sectional view of the inflatable restraint system of FIG. 1, the system being shown in an expanded condition immediately after a collision.

Although the inflatable restraint system 30 could be mounted on many different parts of the vehicle, the restraint system is illustrated in FIGS. 1 and 2 as being mounted on a dashboard 35 of the vehicle. The restraint system includes a rigid metal reaction canister 38 which is fixed to the dashboard 35. The inflator assembly 34 is mounted within the reaction canister 38 in an orientation so that an initial flow of gas, indicated by the arrows 42 in FIG. 2, causes the airbag to expand rearwardly into the passenger compartment. At high temperatures while the airbag 32 is expanding, excess gas from the inflator assembly 34 is exhausted in a forward direction, as indicated by the arrows 44 in FIG. 2.

When the airbag is expanded, it engages the torso of an occupant of a vehicle to restrain forward movement of the occupant of the vehicle toward the dashboard 35 under the influence of collision-induced forces. The airbag 32 quickly collapses so that the occupant is free to exit from the vehicle. To effect collapsing of the airbag 32, the airbag is preferably formed of a porous material which enables gas to flow out of the bag into the vehicle passenger compartment.

Upon the occurrence of a collision, an inertia sensor (not shown) transmits a signal over leads 50 (FIGS. 3 and 4) to effect actuation of an ignitor assembly or squib 52 at the left end (as viewed in FIGS. 3, 4 and 5) of the inflator assembly 34. Hot gases and flame from the ignitor assembly 52 cause ignition of gas generating material 60. The gas generating material 60 includes a plurality of cylindrically shaped grains 64, which encircle the ignitor assembly 52 and a plurality of cylindrically shaped grains 66 which are spaced from the ignitor assembly 52. The actuation of the ignitor assembly 52 and the ignition of the grains 64, 66 is extremely rapid and combustion of the grains 64, 66 occurs quickly to generate a relatively large volume of gas rapidly.

The gas generated by combustion of the grains 64, 66 flows through openings in a rigid cylindrical tube 70 which surrounds the grains 64, 66. The gas then flows through a filter assembly 72. The filter assembly 72 prevents sparks and/or particles of hot material from entering the airbag 32. The gas then encounters a layer 76 of foil which the gas ruptures upon building up sufficient pressure. Lastly, the gas flows through rearwardly facing openings 78 in cylindrical sidewall 80 in the inflator housing 84 into the reaction canister 38 and the airbag 32 (FIG. 1). In the event that excess gas is generated by the inflator assembly, such excess gas is exhausted. The excess gas is directed from the inflator assembly into the passenger compartment of the vehicle through forwardly facing openings 86 in the housing 84.

Inflator Assembly—Ignitor

Figure 5:
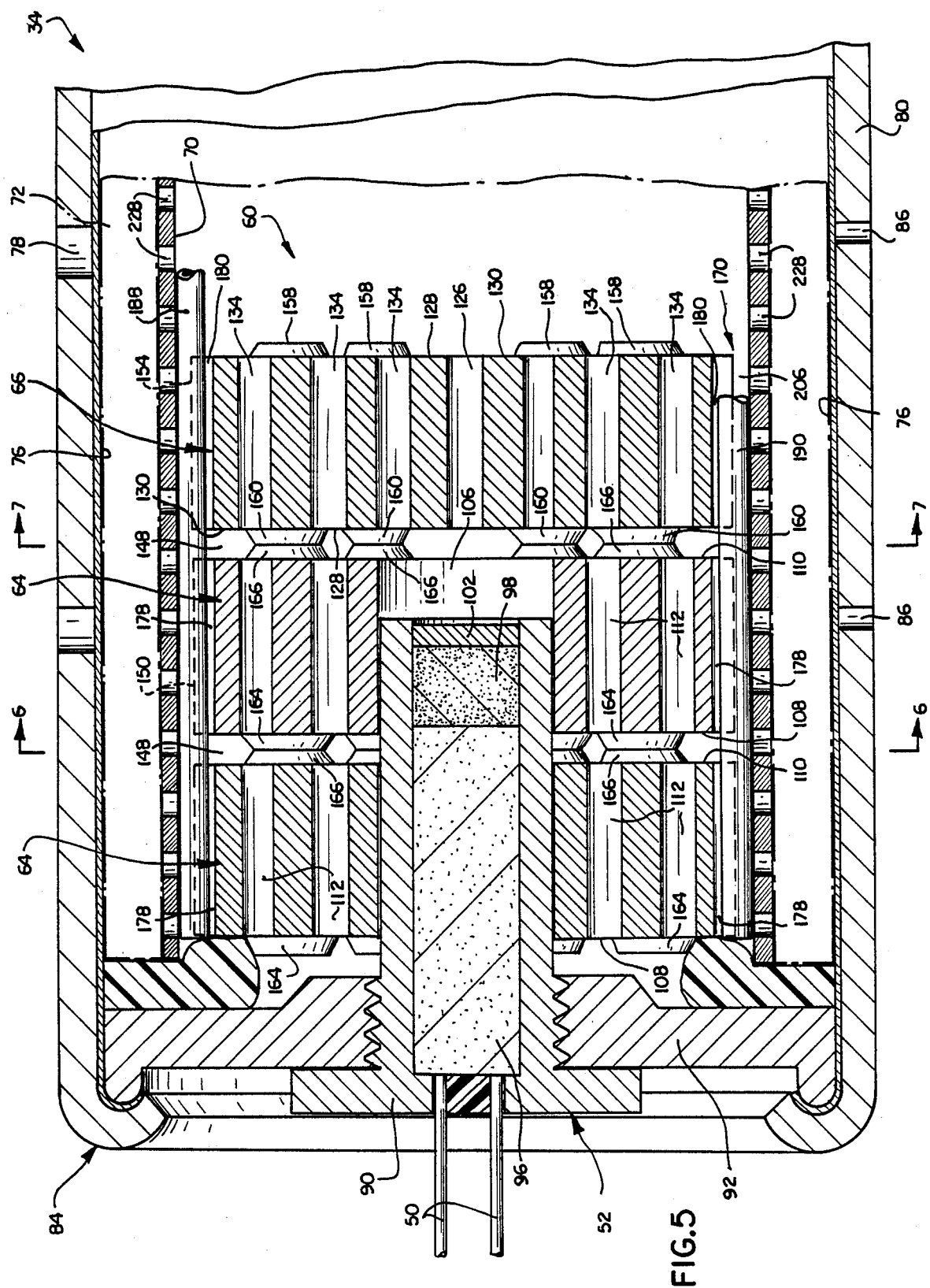
FIG. 5 is an enlarged fragmentary sectional view of a portion of the inflator assembly of FIG. 4.

Upon the occurrence of a collision, the ignitor assembly 52 ignites the gas generating material 60. The ignitor assembly 52 includes a housing 90 (FIG. 5) which screws into a circular end wall 92 of the housing 84. The ignitor housing 90 contains an ignitable material 96 which is ignited by electrical current conducted through the leads 50 upon the occurrence of a collision. Ignition of the material 96 results in actuation of a pyrotechnic material 98 (FIG. 5). Actuation of the material 98 ruptures a circular end wall 102 of the ignitor housing 90. As this occurs, a stream of hot gases is directed against the grains 64, 66 to ignite the grains.

The material 98 may be any one of a number of different materials, such as titanium potassium chlorate or zirconium potassium chlorate. However, it is important that destructive effects due to igniter firing be avoided. Specifically, it is important to avoid high peak pressure which could cause a grain or grains to shatter. The use of a boron potassium nitrate, 20 microns in particle size, as the material 98 can minimize the peak pressure and thus the possibility of grain damage.

Inflator Assembly—Grains

Upon ignition by the ignitor assembly 52, combustion of the grains 64, 66 quickly occurs to generate a large volume of gas in a short time. The grains 64 and 66 have an outer combustion enhancing coating which is highly combustible and results in rapid ignition of all outer surface areas of the grains 64 and 66.

The grains 64, 66 may be made of an alkali metal azide compound. Those compounds are represented by the formula $MN_3$ where M is an alkali metal, preferably sodium or potassium and most preferably sodium. The grains 64, 66 preferably are made of a material which includes 61 to 68% by weight of sodium azide, 0 to 5% by weight of sodium nitrate, 0 to 5% by weight of bentonite, 23 to 28% by weight of iron oxide, 2 to 6% by weight of graphite fibers and 1 to 2% of fumed silicon dioxide. Preferably, the composition of the grain is 63% by weight of sodium azide, 2.5% by weight of sodium nitrate, 2% by weight of bentonite, 26.5% by weight of iron oxide, 4% by weight of graphite fiber and 2% by weight of fumed silicon dioxide. The fumed silicon dioxide is sold under the trademark CAB-O-SIL by Cabot Manufacturing Company with a product designation EH5. The graphite fibers are 3-6 microns in diameter and 40 to 80 thousandths of an inch in length.

The material of which the grains 64, 66 are made is essentially known except for the inclusion of the graphite fibers. The graphite fibers mechanically reinforce the grains. Specifically, the fibers minimize the possibility of the grain cracking. Cracks in a grain would produce unwanted additional grain surface area that acts to accelerate the grain burn rate in an unpredictable manner. The graphite fibers also provide mechanical reinforcement so that when the grain burns it more readily forms a strong structural sinter. The sinter controls the combustion products of the grain. Also, the graphite fibers cause the grains to burn at an increased rate and at a decreased temperature. Specifically, the graphite fibers increase the burn rate of the grain by 40%. The grain burns at a relatively low temperature in the neighborhood of 1800 degrees F. Other fibers such as fiberglass and steel wool could be used.

The combustion enhancing coating on the grains 64, 66 includes 20 to 50% by weight of an alkali metal azide, preferably sodium azide, 25 to 35% by weight of an inorganic oxidizer, preferably sodium nitrate, 1 to 3% by weight of fumed silicon dioxide, 10 to 15% by weight of a fluoroelastomer such as Viton or Teflon, 15 to 25% by weight of magnesium, and 1 to 6% by weight of graphite. Preferably, the coating mix includes 34% by weight of sodium azide, 28% by weight of sodium nitrate, 2% by weight of fumed silicon dioxide, 12% by weight of a fluoroelastomer, 19% by weight of magnesium, and 5% by weight of graphite. Generally, the coating should provide a weight gain of 2 to 3.5% of the total weight of the grain prior to being coated.

The fumed silicon dioxide in the coating is sold by the Cabot Manufacturing Company under the trademark CAB-O-SIL and has a product designation of EH5. The fumed silicon dioxide has a particle size of 0.01 microns. The magnesium preferably has a particle size of 45 microns, and the sodium azide and sodium nitrate have a particle size of preferably 4 microns.

Each of the two cylindrical grains 64 (FIG. 6) has a circular central passage 106 which receives the cylindrical ignitor housing 90 (FIG. 5). The passage 106 extends through the end grain 64 between axially opposite end faces 108 and 110 (FIG. 5) of the end grain. The central axis of the passage 106 is coincident with the central axis of the cylindrical grain 64.

In order to maximize the rate of combustion of the two end grains 64 and the amount of gas generated, a plurality of cylindrical passages 112 extend through the grains 64 between the axially opposite end faces 108 and 110. The axes of the passages 112 extend parallel to the central axes of the grains 64 and parallel to the central passages 106. The central axes of the passages 112 are disposed on inner and outer concentric circles 116 and 118 (FIG. 6) having a common center on the central axis of the grain 64. The ratio of the diameter of the circle 116 to the diameter of the circle 118 of the grains 64 is 2.91 to 1.93.

The passages 112 on the inner circle 118 are circumferentially spaced around the grain from the axes of the passages 112 on the outer concentric circle 116. Thus, a radius extending from the center of the grains 64 to the central axis of any one of the passages 112 disposed on the outer concentric circle 116 is angularly offset from any radius extending from the center of the grain 64 to the central axis of a passage 112 disposed on the inner concentric circle 118. This results in the central axis of each of the passages 112 being disposed in a radial plane which is angularly offset from a radial plane containing the central axis of any of the other passages.

Figure 6:
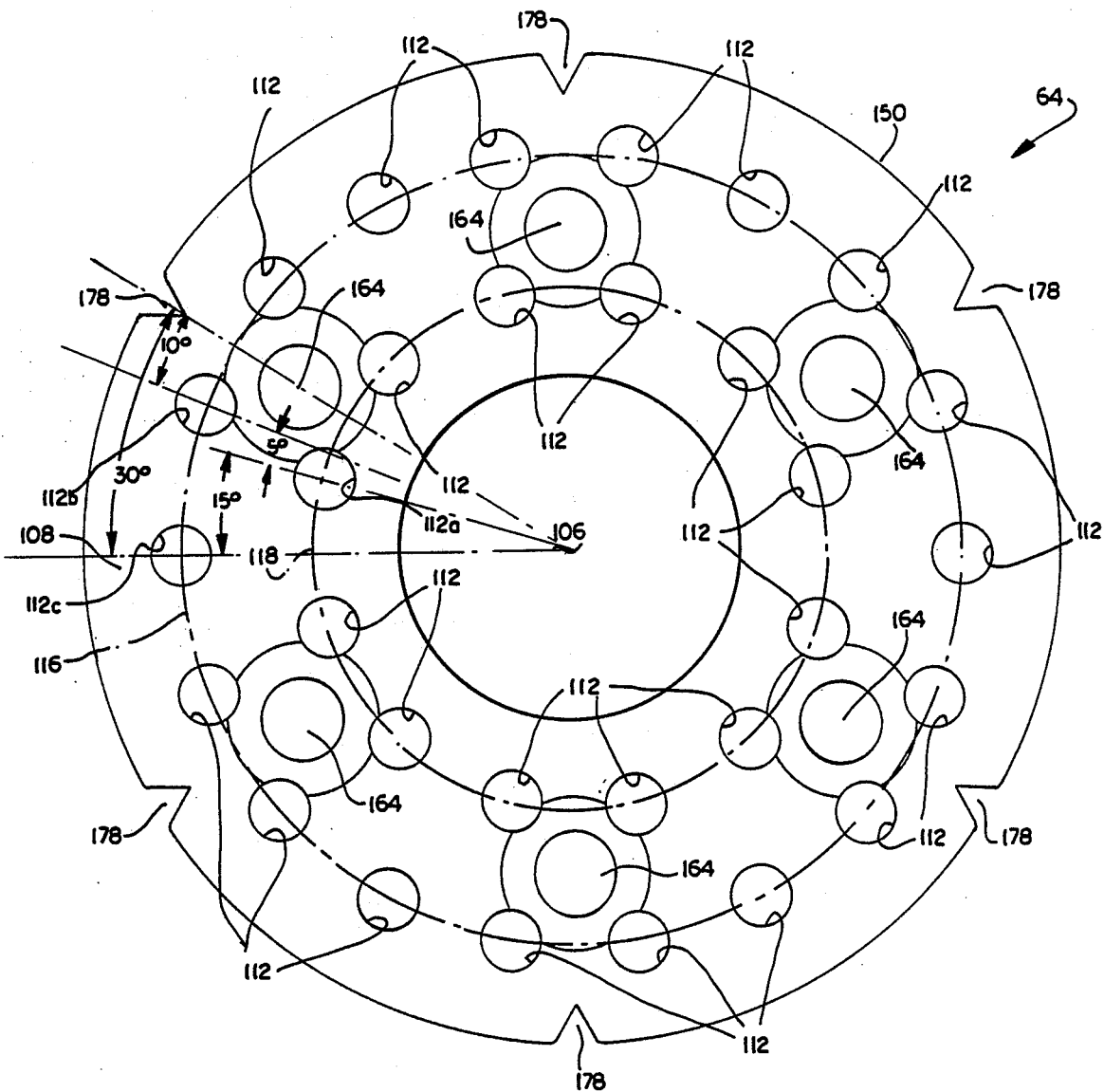
FIG. 6 is plan view, taken generally along the line 6—6 of FIG. 5, illustrating the configuration of a grain of gas generating material.

For example, the angular offset between the central axis of passage 112a on circle 118 and the central axis of passage 112b on circle 116 is five (5) degrees. The angular offset between the central axis of passage 112a and the central axis of passage 112c on circle 116 is fifteen (15) degrees. These angular offsets are shown in FIG. 6 and are the same for the corresponding passages around the grain. The end grains 64 have thirty passages 112 disposed on concentric circles. Twelve passages 112 are disposed on he inner concentric circle 118. Eighteen passages 112 are disposed on the outer concentric circle 116.

The main grains 66 have the same general construction as the end grains 64. Each of the main grains 66 (FIGS. 7 and 8) has a relatively small cylindrical central passage 126 having an axis disposed on the central axis of the grain. The passage 126 extends between opposite axial end faces 128 and 130 of the main grain. In addition, each main grain 66 has a plurality of cylindrical passages 134 which extend axially through the grain 66 between the opposite end faces 128 and 130. The central axes of the passages 134 extend parallel to the central axis of the passage 126 and parallel to the central axis of the grain 66. The cross sections of the passages 126 and 134 are circular and identical in diameter and uniform throughout their extent. The diameters of the passages 126 and 134 in the main grains 66 are equal to the diameters of the passages 112 in the end grains 64.

The centers of the passages 134 are evenly spaced on concentric circles 138, 140, and 142, which have their centers on the central axis of the grain 66. There are eighteen passages 134 on the outer concentric circle 138, twelve passages 134 on the intermediate concentric circle 140 and six passages 134 on the inner concentric circle 142. Thus, the total number of passages 134 extending between the opposite end faces 128 and 130 of each grain 66 is thirty-seven, counting the one passage 126 at the center of the grain 66.

To promote uniform combustion of the main grains 66, the passages 134 are disposed on the concentric circles 138, 140 and 142 with the centers of the passages spaced the same distance apart along the concentric circles. The radial distance of the axis of the central passage 126 to the axis of any one of the passages 134 disposed on the concentric circle 142 is equal to the spacing of the axes of the passages 134 along the concentric circle 142. The diameters of the concentric circles 138, 140 and 142 are in the ratio of 2.91 to 1.93 to 1.

Figure 7:
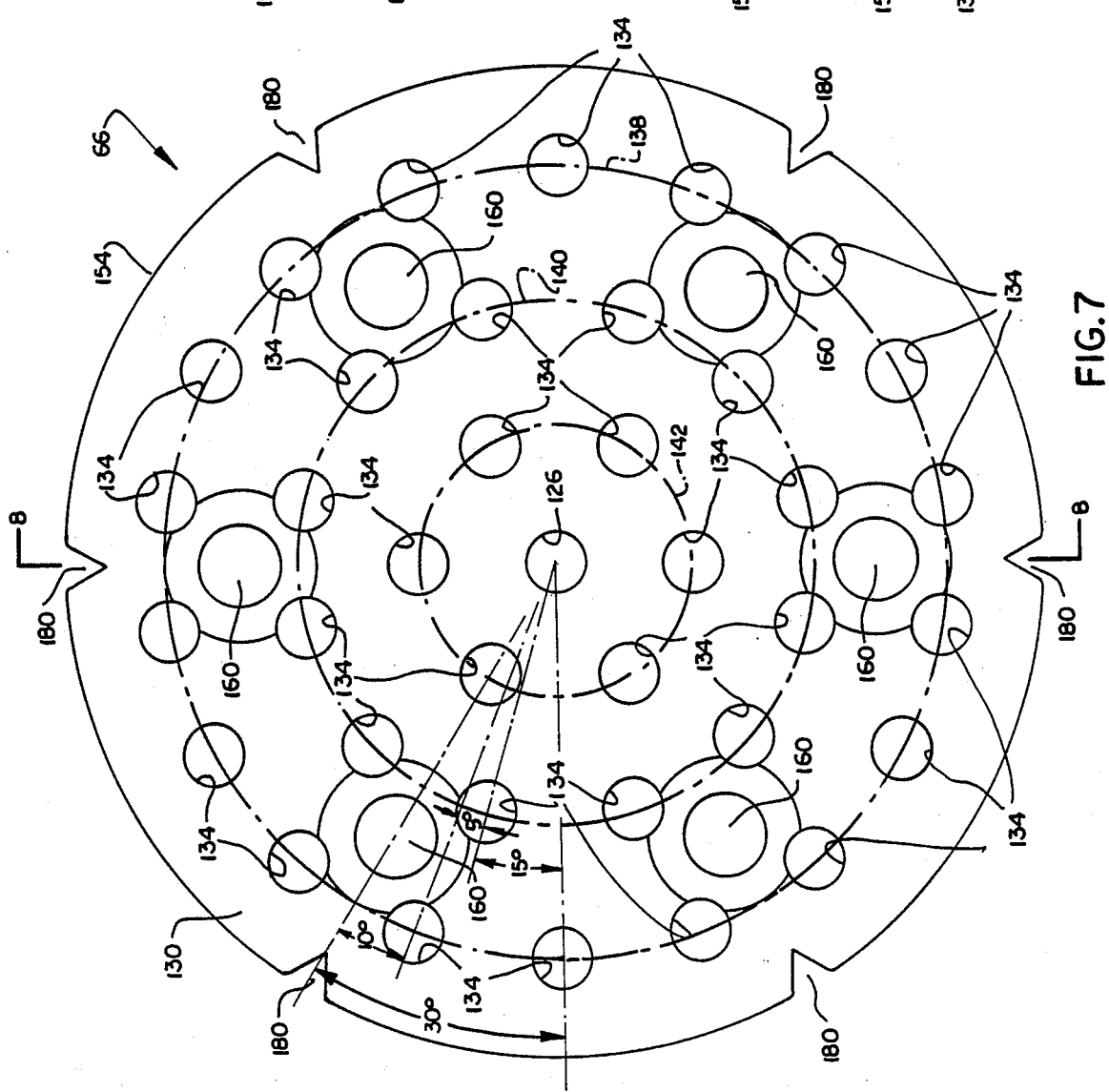
FIG. 7 is a plan view, taken generally along the line 7—7 of FIG. 5, illustrating the configuration of another grain of gas generating material.

The axes of the passages 134 on any one of the concentric circles 138, 140 or 142 are circumferentially spaced around the grain from the axes of passages on the other concentric circles. Thus, a radius extending from the center of the grains 66 to the axis of any one of the passages 134 is angularly offset from the radius extending from the center of the grain to the central axis of any other passage 134. The extent of the angular offset between the central axis of a passage 134 on any one of the concentric circles 138, 140, and 142 and the central axes of the adjacent passages on the other concentric circles varies between 5 and 30 degrees depending upon which of the passages 134 is being considered. The angular offsets are shown in FIG. 7 for certain passages and are the same for the corresponding passages around the grain. The spacing of the passages in the grains 64, 66 promotes uniform burning of the grain, as will be described.

The gas which is generated within the passages 112 and 134 must be able to get out of the passages and flow through the filter assembly 72 and housing 84 into the airbag 32 to inflate the airbag. To provide for such flow, spaces 148 (FIGS. 4 and 5) are provided between axial end faces of adjacent grains 64 and 66. The spaces 148 on opposite axial ends of the end grains 64 extend radially outwardly from the central opening 106 on the end faces 108 or 110 (FIG. 5) to the cylindrical outer side surfaces 150 (FIG. 6) of the end grains. Similarly, the spaces 148 at opposite ends of the grains 66 extend radially outwardly from the central passage 126 along the opposite axial end faces 128 or 130 (FIGS. 5 and 8) to a cylindrical outer side 154 of the grains 66. Since the spaces 148 are provided between the ends of adjacent grains 64 and 66 throughout the extent of the longitudinally extending array of grains in the inflator assembly 34, an even flow of gas from the inflator assembly throughout its length is promoted.

The spaces 148 between the ends of adjacent grains are provided by axially projecting standoff pads or projections 158 and 160 (FIG. 8) at the axially opposite end faces 128 and 130 of the grains. Each of the pads 158, 160 has a circular configuration which is centrally disposed within a rectangular array of passages 134 (see FIG. 7). The rectangular arrays of passages 134 around the pads 160 include spaced apart pairs of passages disposed along the intermediate concentric circle 140 (FIG. 7) and the outer concentric circle 138.

The pads 158, 160 are disposed midway between the outer and intermediate concentric circles 138 and 140. Each of the pads 158, 160 has a central axis which is equally spaced from the central axes of each of the passages 134 forming a rectangular array around the pad. If the pads 158, 160 were moved inwardly to a location between the intermediate concentric circle 140 and inner concentric circle 142, only three pads could be provided at one end of the main grain 66 rather than the six pads which are provided between the outer and intermediate concentric circles 138 and 140.

Figure 8:
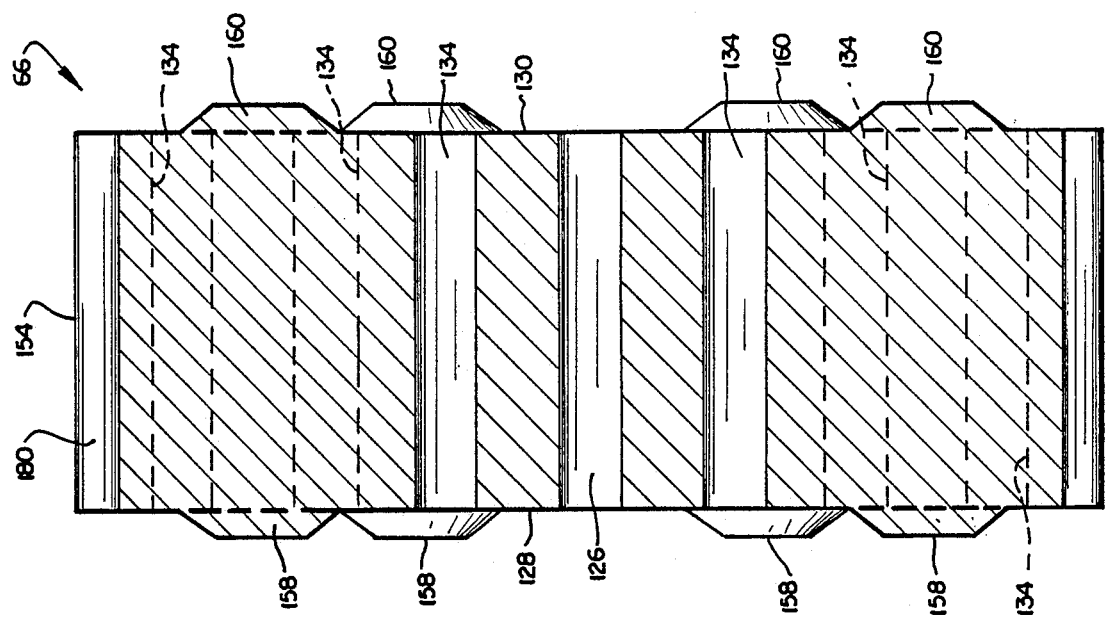
FIG. 8 is a sectional view, taken generally along the line 8—8 of FIG. 7, illustrating the manner in which passages extend through the grain of gas generating material.

Although only the pads 158 and 160 on the main grain 66 are illustrated in FIGS. 7 and 8, it should be understood that each of the end grains 64 is provided with standoff pads 164 and 166 (FIGS. 5 and 6) which are disposed on opposite axial end faces 108 and 110, respectively, of the end grains 64. The standoff pads 164 and 166 for the end grains 64 are centrally disposed within rectangular arrays of passages 112 in the same manner as the standoff pads 158 and 160 for the main grains 66. The standoff pads 164 and 166 for the end grains 64 are disposed between the concentric circles 116 and 118 in the same manner as the standoff pads 158 and 160 for the main grains 66 are disposed between the concentric circles 140 and 142.

The standoff pads for one grain engage the standoff pads on a next adjacent grain to provide the equal size spaces 148 between the grains 64 and 66. Thus, the end grain 64 which is farthest to the left in FIG. 5 has six rightwardly projecting standoff pads 166 which abuttingly engage six leftwardly projecting standoff pads 164 on the next adjacent end grain 64. This results in the formation of a space 148 between the end faces 108 and 110 of the end grains 64, and this space has an axial extent equal to the combined axial extent of the standoff pads 164 and 166. The axial extent of the space 148 is also approximately equal to the diameter of the passages 112 through the grains 64.

Similarly, standoff pads 166 on the rightwardmost (as viewed in FIG. 5) end grain 64 engage leftwardly projecting standoff pads 160 on the leftwardmost main grain 66 to form a space 148 between the end grain 64 and main grain 66. The rightwardly (as viewed in FIG. 5) projecting pads 158 on the main grain 66 illustrated in FIG. 5 abuttingly engage leftwardly projecting pads 160 on a next succeeding main grain (not shown in FIG. 5) to form the space 148 between the two main grains. Since all of the standoff pads 158, 160, 164 and 166 are of the same size and configuration, the spaces 148 between the grains 64 are all of the same size and configuration. Although the standoff pads 158, 160, 164 and 166 have been shown as projecting from opposite axial ends of the grains 64 and 66, the pads could project from only one end of each of the grains so that the space 148 between the grains would be formed by single standoff

Inflator Assembly—Grain Retainer

Figure 9:
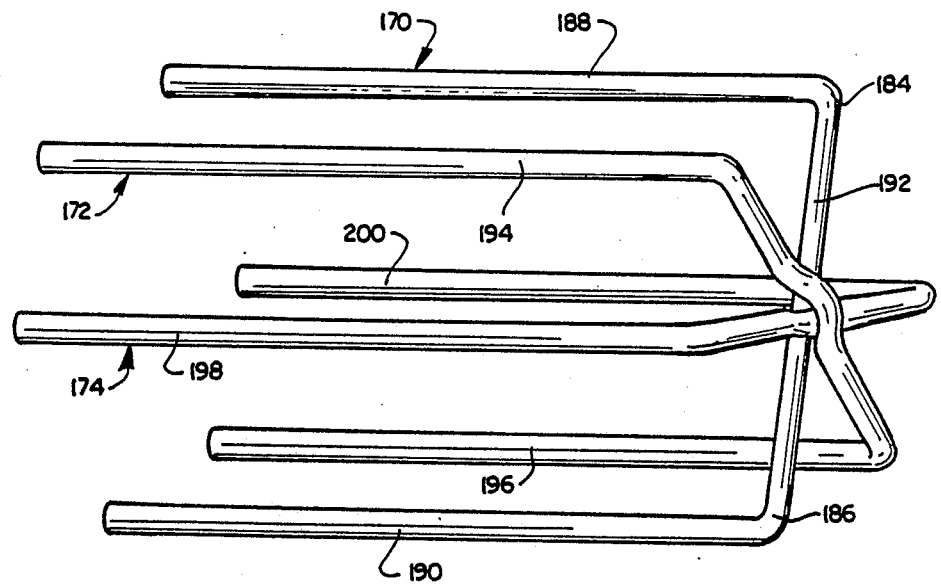
FIG. 9 is an illustration depicting the relationship between and configuration of tubular retainers used to position and support the grains of gas generating material.

The grains 64 and 66 are held in axial alignment with each other and are cushioned against forces encountered during operation of a vehicle by a plurality of retainer tubes 170, 172 and 174 (FIG. 9). The hollow cylindrical retainer tubes 170, 172 and 174 engage V-shaped notches 178 (FIG. 6) on the outer sides 150 of the end grains 64 and V-shaped notches 180 (FIG. 7) on the outer sides 154 of the main grains 66. The hollow cylindrical retainer tubes 170, 172 and 174 are formed of a resiliently deflectable material, preferably silicone rubber.

The retainer tube 170 (FIG. 9) is bent to form a pair of parallel legs 188 and 190 interconnected by an intermediate section 192. The retainer tubes 172 and 174 are similarly bent to form parallel legs 194, 196, 198 and 200. The legs 188 and 190 of the retainer tube 170 engage diametrically opposite notches 178 in the end grains 64 and diametrically opposite notches 180 in the main grain 66 in the manner shown in FIG. 5. The legs 194, 196, 198 and 200 are similarly placed in notches in the end and main grains 64 and 66. The connector sections between the legs 188, 190, 194, 196, 198 and 200 extend across the end face of the last main grain 66 in the longitudinal array of grains, that is the rightwardmost grain 66 of FIG. 4.

The tubular legs of the retainer tubes 170, 172, 174 hold the grains in axial alignment with each other so that the passages 112 through the end grains 64 and the passages 134 through the main grains 66 are all disposed in axial alignment with each other. This results in the grains 64 and 66 being stacked in a longitudinally extending cylindrical array.

The end and main grains 64 and 66 are supported in a coaxial and spaced apart relationship with the rigid perforated tube 70 by engagement of the retainer tubes 170, 172 and 174 with the perforated tube 70. The outer side surfaces of the legs 188, 190, 194, 196, 198 and 200 of the retainer tubes 170, 172, 174 abuttingly engage the cylindrical inner side surface of the perforated tube 70 to support the end and main grains 64 and 66 in a coaxial relationship within the tube 70.

The space between the outer side surfaces 150 and 154 of the end and main grains 64 and 66 and the inner side surface of the perforated tube 70 forms an inner plenum chamber 206 (FIG. 5) between the grains 64 and 66 and the tube 70. This plenum chamber extends throughout the length of the inflator assembly 34 and is formed by an annular array of arcuate chamber segments disposed between the legs 188, 190, 194, 196, 198 and 200 of the retainer tubes 170, 172 and 174. All of the spaces 148 between the grains 64 and 66 are connected with the plenum chamber 206 to tend to equalize the pressure along the axial extent of the tube 70 and filter assembly 72 before the gases flow through the filter assembly.

Since the retainer tubes 170, 172, 174 are hollow and are made of a resiliently yieldable material, the retainer tubes attenuate vibration and shock forces transmitted to the inflator assembly 34 before these forces reach the grains 64 and 66. The legs 188, 190, 194, 196, 198 and 200 of the retainer tubes 170, 172 and 174 can also be resiliently compressed slightly to allow the grains to shift somewhat relative to the tube 70 without touching the tube 70. The opposite ends of the longitudinally extending array of grains 64 and 66 are sealed and cushioned by engagement with resilient circular bodies 210 and 212 (FIG. 4) of silicone rubber sealant. Similar results can be obtained by using roll pins, i.e. split resilient metal tubes.

Inflator Assembly—Grain Combustion

Upon actuation of the ignitor assembly 52, combustion of all exposed surfaces of the grains 64, 66 occurs. This occurs in a few milli-seconds. A supersonic combustion wave propagates through the aligned passages 112, 134 and spreads across the axial end surfaces 108, 110, 128, 130 and across outer side surfaces 150, 154 of the grains 64, 66. The passages 112, 134 allow for high speed spreading of the flame. The combustion is uniform throughout the grains 64 and 66 due to the uniform spacing of the passages. The grains 64 and 66 rapidly burn from their exposed surfaces. The manner in which a main grain 66 burns is illustrated schematically in FIG. 10.

Figure 10:
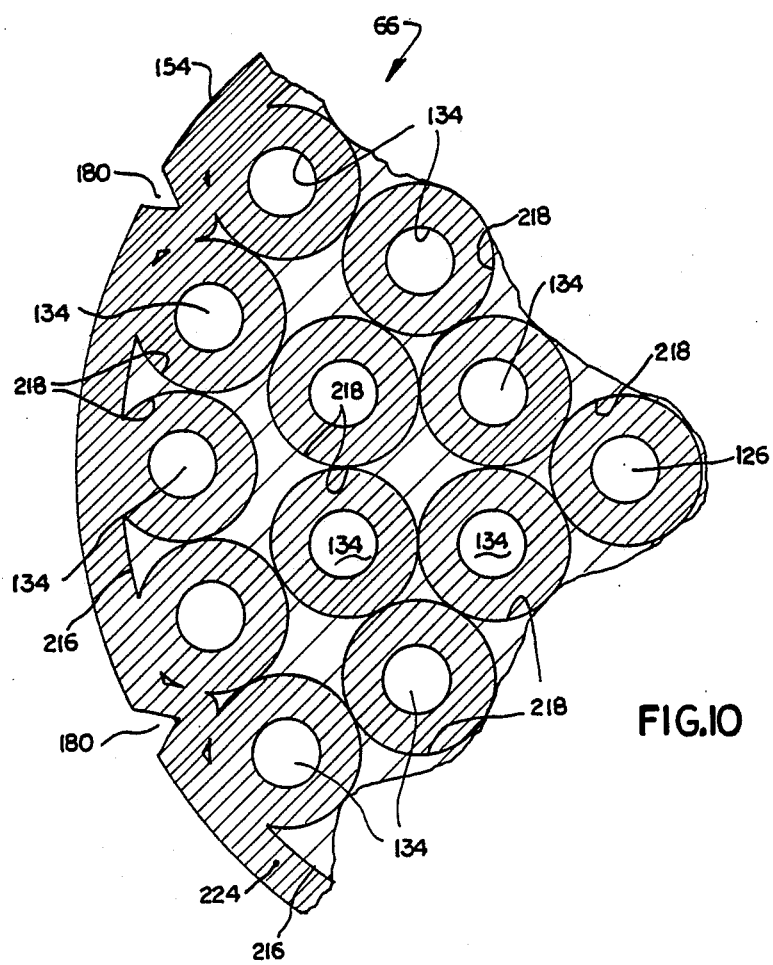
FIG. 10 is a fragmentary schematic illustration depicting the progression of combustion of a portion of a grain of gas generating material.

As a grain 66 combusts or burns inwardly from its cylindrical outer side 154, material of the grain burns radially inwardly along a circular front, a portion of which is indicated at 216 in FIG. 10. At the same time, the material of the grain 66 combusts from the side surfaces of the passages 134 along circular fronts indicated at 218 in FIG. 10.

In the schematic illustration of FIG. 10, the combustion of the grain material from the inner side surfaces of the passages 134 has progressed outwardly to a location at which the burning fronts 218 for most of the passages intersect burning fronts from adjacent passages Similarly, the burning front 216 from the outer side surface 154 of the grain has progressed to a location where it has intercepted the outwardly moving burning fronts 218 from the radially outermost passages 134.

The radially innermost surface portions of the notches 180 are spaced from the surfaces of the most closely adjacent passages 134 by a distance which is the same as the shortest distance between the surfaces of adjacent passages in the radially outermost circular array of passages 134. Therefore, the inwardly moving burning fronts from the notches 180 intersect the outwardly moving burning fronts 218 from the radially outermost passages 134 at about the same time as the burning fronts 218 from adjacent passages 134 along the same concentric circles intersect.

As the grain 66 (FIG. 10) is burned, a sinter 224 is formed adjacent to the surfaces of the grain. The sinter 224 is structurally weaker than the unburned material of the grain 66. By having the burning fronts 216 and 218 from the various surfaces of the grain 66 intersect each other at approximately the same time, the structural strength of the grain 66 is maintained during combustion of the grain. The structural strength of the sinter 224 is maximized by providing the graphite fibers in the grains.

As combustion of the end and main grains 64 and 66 occurs, in a manner similar to that illustrated in FIG. 10 for a main grain 66, gas is generated at the passages 112 and 134 extending through the grains. This gas is conducted from the open ends of the passages 112 and 134 into the radially extending spaces 148 between the grains 64 and 66. Gas then flows radially outwardly from the spaces 148 into the inner plenum chamber 206 between the tube 70 and the outer side surfaces of the grains 64 and 66.

The gas in the plenum chamber 206 then flows through openings 228 in the tube 70 into the filter assembly 72. Even though there is extremely rapid generation of gas and flow of gas from the spaces 148 into the plenum chamber 206, the plenum chamber 206 allows the fluid pressure to tend to equalize along the axial extent of the inner side surface of the tube 70. Therefore, the flow rate through the equal size openings 228 formed throughout the length of the tube 70 into the filter assembly 72 is substantially uniform. This promotes a uniform flow of gas into the airbag 32 throughout the axial extent of the inflator assembly 34.

Inflator Assembly—Filter Assembly

The cylindrical filter assembly 72 (FIG. 11) prevents hot particles from being conducted from the grains 64 and 66 into the airbag 32 during inflation of the airbag. The filter assembly 72 is wound around the rigid cylindrical perforated tube 70 and includes two layers 240 and 242 of 24 mesh screen which are wound directly around the perforated tube 70. A layer 244 of steel wool and a third layer 246 of 24 mesh screen are disposed over the two inner layers 240 and 242 of screen. A layer 248 of ceramic/glass and a second layer 250 of steel wool are next in the filter assembly. A layer 252 of 24 mesh screen overlies the layer 250 of steel wool. A second layer 254 of ceramic/glass wool and another layer 256 of steel wool are enclosed by the final filter layer 258 of 24 mesh screen.

An outer plenum chamber 262 is formed between the outer filter layer 258 and the layer 76 of foil. The space for the tubular cylindrical plenum chamber 262 (FIG. 11) is formed by a cylindrical layer 264 of 8 mesh screen.

The filter assembly 72 is made by wrapping layers of screen, steel wool, and ceramic/glass wool around the tube 70. To form the filter assembly 72, a flat layer 270 of screen (FIG. 12) is laid out. A flat layer 272 of steel wool is placed on top of the layer 270 of screen. A flat layer 274 of fiberglass is then placed on the steel wool. The cylindrical tube 70 is rolled leftwardly (as viewed in FIG. 12), to the position shown in FIG. 13 to wrap two layers 240 and 242 of 24 mesh screen around tube 70. Continued rotation of the tube 70 wraps the layer 244 of steel wool and the next succeeding layer 246 of screen around the tube (FIG. 14). Continued rotation of the tube 70, to the position shown in FIG. 15, rolls the screen 270, steel wool 272 and ceramic/glass wool 274 around the tube 70 to form the layers 248 and 254 of steel wool (FIG. 15), the layers 250 and 256 of ceramic/glass wool and the layers 252 and 258 of 24 mesh screen. Each rotation of the tube 70 is about 370 degrees. This results in the end of the various layers on the tube being staggered.

Lastly, the plenum forming layer 264 (FIG. 11) of very coarse, 8 mesh screen is placed around the outer layer 258 of screen. The entire cylindrical package is then inserted into the inflator housing 84 in which the pressure controlling strip of foil 76 has been secured.

Inflator Assembly—Pressure Control

When the airbag 32 is inflated in a warm environment, a given rate of generation of hot gases by combustion of the grains 64 and 66 will result in a faster build up of pressure in the airbag 32 than will the same rate of generation of hot gases in a cold environment. However, it is desirable to inflate the airbag 32 uniformly in both warm and cold environments. The problem of inflating the airbag 32 uniformly in both warm and cold environments is accentuated by the fact that the combustion rate in the grains 64 and 66 tends to increase with increasing temperature.

In order to effect uniform inflation of the airbag 32 in both warm and cold environments, the pressure controlling layer 76 (FIG. 16) of foil is disposed immediately inside the cylindrical wall 80 of the inflator housing 84. The layer 76 of foil is formed as a cylinder and is sealed at a longitudinally extending joint 282. Prior to combustion of the grains 64 and 66, the layer 76 of foil blocks the rearwardly facing openings 78 (FIG. 16) in the cylindrical side wall 80 of the inflator housing 94. In addition, the foil layer 76 blocks the forwardly facing openings 86 in the housing side wall 80.

Upon initiation of combustion of the grains 64 and 66, gas flows into the plenum chamber 262 (FIG. 11) and applies pressure against the cylindrical inner side surface of the layer 76 of foil. This fluid pressure presses the foil outwardly against the inside of the housing. When the fluid pressure in the plenum chamber 262 has increased to a predetermined magnitude, the foil layer 76 is ruptured to form openings 286 (FIG. 17) adjacent to the forward openings 78 in the housing.

As the fluid pressure in the plenum chamber 262 increases prior to formation of the foil openings 286, fluid pressure against an unsupported circular area 288 (FIG. 18) of the foil blocking an opening 78 increases. At a predetermined pressure, the foil is severed at a circular edge 290 of the opening 78 and the opening 286 (FIG. 17) is formed in the foil layer 76. This allows high pressure gas to flow from the plenum chamber 262 into the reaction canister 38 and the airbag 32 in the manner illustrated in FIG. 2. Although only a single opening 78 has been shown in FIG. 18, it should be understood that there are a plurality of longitudinally extending rows of rearwardly facing openings 78 (FIG. 3).

Figure 19:
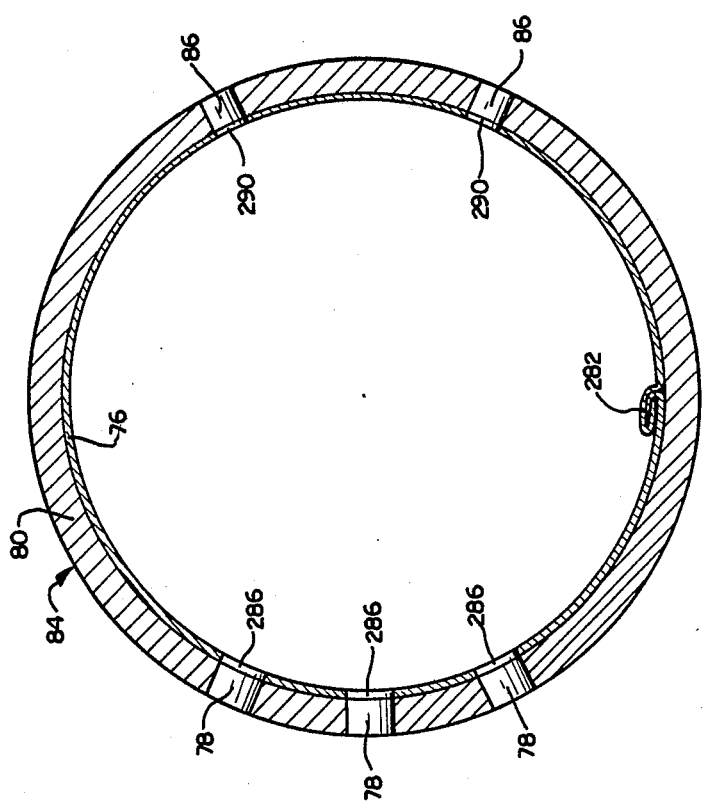
FIG. 19 is a sectional view illustrating the relationship between the layer of foil and the housing openings during the exhausting of excess gas from the inflator assembly.
Figure 20:
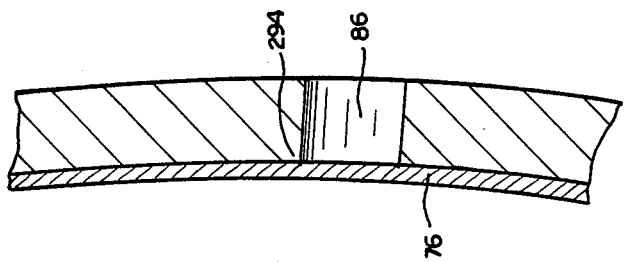
FIG. 20 is an enlarged illustration further depicting the relationship between the foil and a housing opening through which excess gas is directed from the inflator assembly.

As the airbag 32 is inflated, the fluid pressure in the airbag and the fluid pressure in the plenum chamber 262 increases. When a second, higher predetermined fluid pressure has been obtained in the plenum chamber 262, the foil layer 76 is ruptured to form openings 290 (FIG. 19) adjacent to the forwardly facing openings 86 in the housing side wall 84. This results in excess gas being exhausted from the plenum chamber 262 and inflator assembly 34 in a forward direction into the passenger compartment of the vehicle or a conduit leading to the surrounding environment. The openings 290 are formed in the foil layer 76 by pressing the foil layer against the circular edge 294 (FIG. 20) of the opening 86 to sever the foil layer.

In order to form the rearwardly facing openings 286 before the forwardly facing openings 290 are formed in the foil layer 76 (FIG. 19), the openings 78 have a substantially larger diameter than the openings 86. This results in the unsupported area of the foil extending across the openings 78 being greater than the unsupported area of the foil extending across the openings 86. Therefore, the foil is severed or ruptured at the openings 78 at a lower pressure than the pressure at which the foil is ruptured at openings 86.

By properly sizing the openings 78 and 86, formation of the openings 286 and 290 in the layer of foil will occur at two different preselected pressures. However, it should be understood that due to manufacturing tolerances in the forming of the circular edges 290 and 294 of the openings 78 and 86 (FIGS. 18 and 20), there may be as much as a 10% variation in the fluid pressure at which individual openings 286 and 290 are formed in the foil layer 76. Regardless of the amount of variation of the specific pressure at which the various openings are formed, the two preselected pressures are such that the rearwardly facing openings 286 are formed before the forwardly facing openings 290. The ratio of the diameter of the opening 286 to the diameter of the opening 290 is 4 to 3.

Air Aspiration

Upon burning of grains 64 and 66, a flow 42 (FIG. 2) of high pressure gas is directed from the inflator assembly 34 into the airbag 32. The flow of high pressure gas into the airbag 32 is augmented by aspiration of ambient air through openings 296 and 298 in the side walls 300 and 302, respectively, of the reaction canister 38. The aspirated air mixes with the hot gases generated by combustion of the grains 64 and 66 and tends to cool the gas which inflates the airbag 32. In addition, the aspirated air reduces the amount of gas which must be generated by combustion of the grains 64 and 66.

Prior to establishment of the flow of gas 42 from the inflator assembly 34, the openings 296 and 298 are blocked by a pair of one-way valve arrangements 306 and 308, respectively (FIGS. 1 and 2). The valve arrangement 306 includes a flap 310 formed by a portion of a sheet 312 of foil. A second flap 314 in the valve arrangement 306 is formed by a portion of the material of the airbag 32. When the one-way valve arrangement 306 is in the closed condition of FIG. 1, the flap 314 is disposed in abutting engagement with the inner side surface of the reaction canister 38 and the flap 310 overlies the end of the flap 314.

Upon combustion of the grains 64 and 66 and establishment of the gas flow 42, the flow of gas causes a reduced pressure on the inside of the reaction canister 38 adjacent to the one-way valve 306. This reduced pressure allows the ambient air pressure to press the flaps 310 and 314 inwardly from the closed condition of FIG. 1 to the open condition of FIG. 2. As this occurs, a flow of ambient air, indicated schematically at 320 in FIG. 2, is established into the canister 38. This aspirated air flow augments the flow of gas from the inflator assembly 34.

Simultaneously with opening of the one-way valve 306, the valve 308 opens. This moves a flap 324 formed by a portion of the sheet 312 of foil and a flap 326 formed by a portion of the material of the airbag 32 from the closed condition to the open condition in the same manner previously explained in conjunction with the flaps 310 and 314 for the valve arrangement 306.

After the fluid pressure in the airbag 32 is increased to a value sufficient to result in the formation of the forwardly facing openings 290 (FIG. 19) in the pressure control foil layer 76, streams 44 of excess gas are directed through openings 332 and 334 in the layer of foil 312 and through aligned openings 338 and 340 in the forwardly facing end of the reaction canister 38. It should be noted that the flap forming foil layer 312 is held in place by being pressed against the reaction canister 38 by the inflator assembly 34.

Airbag Mounting

Figure 21:
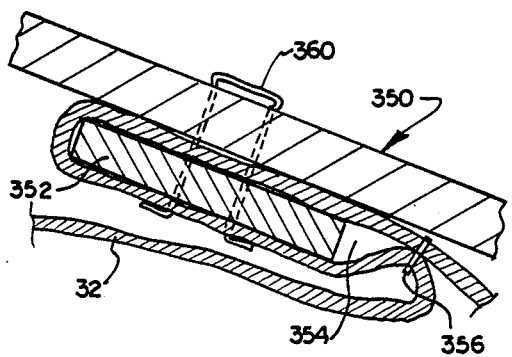
FIG. 21 (on the second sheet of the drawings) is an enlarged schematic sectional view illustrating the manner in which the airbag is attached to a reaction canister.

The material of the airbag is secured to the rectangular open end of the reaction canister 38 by an airbag mounting arrangement 350 (FIG. 21). The airbag mounting arrangement 350 includes a metal bar 352 which is inserted into a pocket 354. The pocket 354 is formed by overlapping the material of the airbag and sewing a hem or stitch line 356.

The material of the airbag 32 and the bar 352 are connected with the edge of the canister side wall 300 by a suitable staple 360. Although one bar 352 and a staple 360 have been shown in FIG. 21, it should be understood that there are four bars mounted in pockets formed in each side of the airbag material to be secured to each side of the canister 38. The bars 352 are stapled in place along each of the four edges of the rectangular, rearwardly-facing, open end of the reaction canister 38 to firmly connect the airbag 32 with the reaction canister 38.

Figure 22:
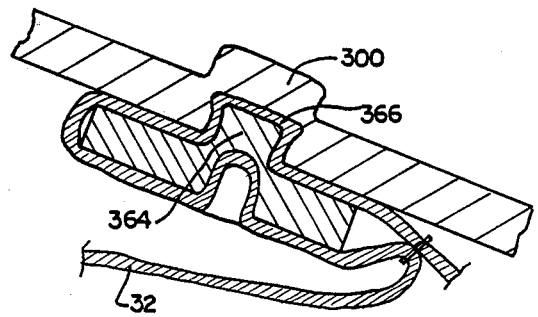
FIG. 22 (on the second sheet of the drawings) is an enlarged schematic sectional view illustrating a second embodiment of the connection between the airbag and reaction canister.

A second embodiment of the connection of the airbag to the reaction canister is illustrated schematically in FIG. 22. This connection is a toggle lock which is formed by placing a strip 364 in a pocket 366 in the material of the airbag 32. The strip 364 and the reaction canister side wall are then crimped to clamp the material of the airbag 32 securely between the strip 364 and the side wall of the canister. It should be understood that this crimping action occurs at a plurality of locations along the rectangular open end of the reaction canister 38.

SUMMARY

In view of the foregoing description, it is apparent that an improved safety apparatus 30 for restraining movement of an occupant of a vehicle includes an inflator assembly 34 which generates gas to expand an airbag 32 to restrain movement of the occupant of the vehicle when the vehicle is involved in a collision. In order to quickly provide a relatively large volume of gas to expand the airbag 32, the inflator assembly 34 includes grains 64 and 66 (FIGS. 5, 6 and 7) of a material which generates gas upon combustion. All exposed surfaces of the grains 64 and 66 burn simultaneously.

The grains 64 and 66 are cylindrical in shape and have passages 112 and 134 extending axially therethrough. The centers of the passages 112 through the end grains 64 are located on concentric circles 116 and 118. The centers of the concentric circles 116 and 118 are located on the central axes of the end grains 64. Similarly, the centers of the passages 134 through the main grains 66 are located on concentric circles 138, 140 and 142. The concentric circles 138, 140 and 142 have centers which are located on the central axes of the main grains 66.

The axes of the passages 112 and 134 are spaced equal distances apart about the concentric circles and the axes of the passages on one of the concentric circles are circumferentially spaced from the axes of the passages on the adjacent concentric circles. This arrangement of the passages 112 and 134 provides for a uniform burning of the grains 64 and 66.

The grains 64 and 66 are located in the inflator assembly 34 with their axial end surfaces 108, 110, 128 and 130 facing each other. As the surfaces defining the passages 112 and 134 burn, the gas flows through the passages to the axial ends of the grains. To enable the gas to flow from the passages radially between the grains 64 and 66 into the airbag 32, the ends of the grains are axially spaced apart to form the spaces 148 between the grains.

The grains 64 and 66 of gas generating material are located internally of a structure which includes a filter assembly 72. The generated gas flows through the filter assembly 72 and into the airbag 32. The grains 64 and 66 are supported with the passages 112 and 134 in the grains axially aligned by resilient retainer tubes 170, 172 and 174 (FIG. 9) which engage the outside of the grains 64 and 66 (FIG. 5). In addition to maintaining the grains in axial alignment, the retainer tubes 170, 172 and 174 are made of a resiliently yieldable material to cushion the grains against the influence of forces encountered during normal operation of a vehicle. The retainer tubes minimize contact between the grains and the surrounding structure, which contact could damage the grains.

The inflator assembly 34 has first passages 78 (FIGS. 3 and 16) for directing gas into the airbag 32 and second passages 86 (FIGS. 16 and 19) for directing excess gas away from the airbag. The first and second passages 78 and 86 are blocked prior to activation of the inflator assembly 34. After activation of the inflator assembly 34, the first passages 78 open to direct gas into the airbag 32 when a sufficient pressure builds up in the inflator assembly. Thus, the airbag 32 is not subjected to relatively low pressure which might cause the airbag to be slowly or otherwise improperly inflated under cold weather conditions. If the pressure in the inflator assembly is too high, as may occur when the ambient temperature is high, the second passages 86 open to direct gas away from the airbag 32. Thus, the airbag is not subjected to excessive pressure because of high ambient temperatures.

The first and second passages 78 and 86 in the inflator assembly 34 open at different pressures. This occurs because a rupturable foil layer 76 covers the first and second passages in the inflator and the first passages 78 are larger in cross section than the second passages 86. Thus, the foil 76 covering the first passages ruptures at a lower pressure than the foil covering the second passages 86.

From the above description of a preferred embodiment of the invention, those skilled in the art will perceive improvements, changes and modifications. Such improvements, changes and modifications within the skill of the art are intended to be covered by the appended claims.

Having described one specific preferred embodiment of the invention, the following is claimed:

1. Apparatus for generating gas, said apparatus comprising:
   a cylindrically shaped grain having a central longitudinal axis and opposite, radially extending end faces spaced apart along the longitudinal axis;
   said grain being made of a material which generates gas upon combustion;
   said grain having a plurality of parallel passages extending therethrough and intersecting said opposite end faces;
   said passages having central longitudinal axes located on concentric circles which have their centers on the longitudinal axis of said grain;
   the axes of the passages on a first one of said concentric circles being circumferentially spaced around said grain from the axes of the passages on a second one of said concentric circles; and
   said passages having axes located on adjacent concentric circles forming a plurality of rectangular arrays of openings in said end faces, one of the end faces of said grain including a plurality of projections, each of said projections being disposed in the center of a rectangular array of openings and having end surface means spaced axially from the one end face for engaging an adjacent surface to provide space for gas to flow across the one end face of said grain during combustion of said grain.

2. An apparatus as set forth in claim 1 wherein said grain includes surface means for defining a plurality of recesses extending axially along an outer side surface of said grain, each of said recesses being disposed radially outwardly of the center of one of the rectangular arrays of passage openings.

3. An apparatus as set forth in claim 2 wherein the shortest distance from a radially innermost portion of one of said recesses and inner side surfaces of passages located on the radially outermost one of the concentric circles and forming openings disposed in one of the rectangular arrays is substantially equal to the shortest distance between the inner side surfaces of adjacent passages located on the outermost concentric circle and forming openings disposed in the one rectangular array.

4. An apparatus as set forth in claim 3 wherein the shortest distance between the inner side surfaces of adjacent passages located on the concentric circle adjacent to the outermost concentric circle and forming openings in the one rectangular array is substantially equal to the shortest distance between the radially innermost portion of said one of said recesses and the inner side surfaces of adjacent passages located on the outermost one of the concentric circles and forming openings disposed in the one rectangular array.

5. Apparatus for generating gas, said apparatus comprising:
   a plurality of grains each of which has a central longitudinal axis and opposed, radially extending end faces spaced apart along the longitudinal axis, each of said grains being made of a material which generates gas upon combustion;
   each of said grains having parallel passages therethrough intersecting said end faces at locations spaced radially inwardly of the outer sides of each of said grains;
   said passages in each of said grains being defined by surfaces where combustion takes place to produce gas which flows through the passages;
   each of said grains having surfaces defining a plurality of recesses extending along the outer side of said grain between said end faces;
   a structure surrounding said plurality of grains; and
   elongated and resiliently yieldable retainer means extending along and projecting from said recesses into engagement with said structure for retaining said grains in positions in which the passages through said grains are axially aligned and for cushioning said grains against the influence of forces applied to said structure.

6. An apparatus as set forth in claim 5 wherein the end faces of at least some of the grains have projections extending therefrom into engagement with adjacent grains to provide space between end faces of said grains to enable gas to flow radially outwardly between said grains, said retainer means spanning the space between ends of adjacent grains to interconnect the adjacent grains.

7. An apparatus as set defined in claim 5 wherein said retainer means comprises resilient tubes located in said recesses and which project beyond the outer periphery of each grain.

8. Apparatus for generating gas for inflating a vehicle occupant restraint, said apparatus comprising:
   a material for generating gas upon burning;
   a container for said material, said container having a first plurality of openings for directing gas into the restraint and a second plurality of openings which are smaller than the openings in said first plurality of openings for directing gas away from the restraint; and means covering said first and second plurality of openings which ruptures at one predetermined pressure to allow gas to flow into the restraint through the first plurality of openings and which ruptures at a predetermined pressure higher than said one pressure to allow gas to flow away from the restraint through the second plurality of openings.

9. An apparatus as defined in claim 8 wherein said means covering said first and second plurality of openings comprises a material rupturable at said one and said higher pressure.

10. An apparatus as defined in claim 8 wherein each opening of said first plurality of openings is of a greater area than each opening of said second plurality of openings.

11. Apparatus for generating gas for inflating a vehicle occupant restraint, said apparatus comprising:
a material for generating gas upon combustion;
a container for said material;
a filter in said container and through which the generated gas flows;
said container having first passage means for directing gas into the restraint and second passage means for directing gas away from the restraint; and
first and second means blocking said first and second passage means respectively and which open at different pressures to enable gas to flow through said first passage means into said restraint when the pressure in said container reaches a predetermined magnitude and excess gas to flow through said second passage means away from said restraint when the pressure in said container reaches a magnitude higher than said predetermined magnitude.

12. An apparatus as defined in claim 11 wherein said first and second means comprises portions of a rupturable foil which blocks said passage means, and said second passage means having a smaller flow area than said first passage means.

13. Apparatus for generating gas for inflating a vehicle occupant restraint, said apparatus comprising:
a plurality of grains of gas generating material arranged in a longitudinal array;
said gas generating material generating gas upon combustion;
at least one of said plurality of grains having a central opening;
an ignitor for igniting said gas generating grains and located in said opening;
each of said grains being cylindrically shaped and having a central longitudinal axis and opposite, radially extending ends spaced apart along the longitudinal axis, each of said grains having a plurality of passages extending therethrough and intersecting said ends, said passages being parallel to each other and to the longitudinal axis of the grain;
at least one end of each grain having projections extending therefrom to engage projections from the end of an adjacent grain to provide space between the grains for the flow of gas radially between the grains; and
each of said grains having aligned recesses on the outer surface thereof and resilient means located in said recesses and projecting therefrom to align said parallel passages in said grains.

14. Apparatus for generating gas, said apparatus comprising:
a cylindrically shaped grain having a central longitudinal axis and opposite, radially extending end faces spaced apart along the longitudinal axis;
said grain being made of a material which generates gas upon combustion;
said grain having a plurality of parallel passages extending therethrough and intersecting said opposite end faces each of the passage having a circular cross-section in a plane extending perpendicular to the longitudinal axis of said grain and having a uniform cross-section throughout its length;
said passages having central longitudinal axes located on concentric circles which have their centers on the longitudinal axis of said grain;
the axis of each of the passages on the first one of said concentric circles being circumferentially spaced around said grain from the axes of adjacent passages on the second one of said concentric circles so that the axis of each of the passages on the first one of said concentric circles is disposed in a radial plane angularly offset from a radial plane containing the axis of any of the adjacent passages on the second one of said concentric circles, said angular offset being five degrees (5°) to fifteen degrees (15°);
the circumferential distance between axes of adjacent passages disposed on the first concentric circle being equal to the circumferential distance between the axes of adjacent passages disposed on the second concentric circle.

* * * * *